(12) United States Patent
Kim et al.

(10) Patent No.: US 12,434,324 B2
(45) Date of Patent: Oct. 7, 2025

(54) ULTRASONIC WELDING DEVICE

(71) Applicant: LG Energy Solution, LTD., Seoul (KR)

(72) Inventors: Jun Tak Kim, Daejeon (KR); Jinseo Park, Daejeon (KR); Kwang Cheol Park, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 18/279,168

(22) PCT Filed: Nov. 18, 2022

(86) PCT No.: PCT/KR2022/018324
§ 371 (c)(1),
(2) Date: Aug. 28, 2023

(87) PCT Pub. No.: WO2023/090943
PCT Pub. Date: May 25, 2023

(65) Prior Publication Data
US 2024/0139858 A1 May 2, 2024

(30) Foreign Application Priority Data

Nov. 19, 2021  (KR) .......................... 10-2021-0160480

(51) Int. Cl.
*B23K 20/10* (2006.01)
*B23K 20/26* (2006.01)
(Continued)

(52) U.S. Cl.
CPC ............ *B23K 20/106* (2013.01); *B23K 20/26* (2013.01); *H01M 10/0409* (2013.01); *H01M 50/566* (2021.01); *B23K 2101/38* (2018.08)

(58) Field of Classification Search
CPC ............ B23K 20/10–106; B23K 20/26; B23K 2101/38; B23K 2101/36; H01M 10/0409;
(Continued)

(56) References Cited

U.S. PATENT DOCUMENTS 5,947,364 A  9/1999 Tamura et al.
6,619,535 B1 * 9/2003 Imanishi ................ H01L 24/78
228/49.5
(Continued)

FOREIGN PATENT DOCUMENTS

CN  1926916 B  *  9/2011  ............... B06B 1/08
CN  205032844 U  *  2/2016
(Continued)

OTHER PUBLICATIONS

International Search Report for PCT/KR2022/018324 (PCT/ISA/210) mailed on Mar. 6, 2023.

*Primary Examiner* — Kiley S Stoner
(74) *Attorney, Agent, or Firm* — Birch, Stewart, Kolasch & Birch, LLP

(57) ABSTRACT

An ultrasonic welding apparatus includes a housing; a horn part coupled to the housing and configured to transmit an ultrasonic wave in one direction; a tip part coupled to the horn part and configured to apply the ultrasonic wave transmitted from the horn part to an object to be welded, and to apply the ultrasonic wave at an angle of 80° or greater and 100° or less with respect to a direction in which the horn part transmits the ultrasonic wave; an anvil part configured to support the object to be welded; and a suction connected to the anvil part and configured to suck a foreign matter generated resulting from ultrasonic welding, in which the tip part is configured to be driven by linear vibration with
(Continued)

respect to the object to be welded, and achieves the effects of easily removing foreign matter and improving welding quality.

13 Claims, 4 Drawing Sheets

(51) Int. Cl.
*H01M 10/04* (2006.01)
*H01M 50/566* (2021.01)
*B23K 101/38* (2006.01)

(58) Field of Classification Search
CPC .......... H01M 50/566; B06B 3/00; B06B 1/02; B08B 15/04; Y02E 60/10; B29C 65/08
USPC ................ 228/110.1, 1.1; 156/73.1–73.5
See application file for complete search history.

(56) References Cited

U.S. PATENT DOCUMENTS

| | | | |
|---|---|---|---|
| 7,175,936 B2 | 2/2007 | Kawamura et al. | |
| 7,896,219 B2 | 3/2011 | Scheuerman et al. | |
| 10,366,844 B2 | 7/2019 | Tamachi et al. | |
| 2006/0149485 A1* | 7/2006 | Oblak | B23K 20/10 |
| | | | 702/56 |
| 2007/0144680 A1* | 6/2007 | Kawada | B06B 3/00 |
| | | | 156/580.1 |
| 2009/0255979 A1* | 10/2009 | Saito | H01L 24/75 |
| | | | 228/1.1 |
| 2010/0224671 A1* | 9/2010 | Scheuerman | H01M 50/503 |
| | | | 228/110.1 |
| 2010/0276061 A1* | 11/2010 | Oblak | B29C 66/9241 |
| | | | 156/73.1 |
| 2019/0275748 A1 | 9/2019 | Vila Noria | |
| 2020/0152952 A1 | 5/2020 | Heo et al. | |
| 2021/0086290 A1 | 3/2021 | Wang et al. | |
| 2021/0114309 A1 | 4/2021 | Beach et al. | |
| 2021/0197308 A1 | 7/2021 | Mitsuyuki | |
| 2021/0379690 A1* | 12/2021 | Copperthite | B23K 20/10 |
| 2022/0088700 A1 | 3/2022 | Mancini et al. | |
| 2024/0139858 A1* | 5/2024 | Kim | B08B 15/04 |

FOREIGN PATENT DOCUMENTS

| | | | | |
|---|---|---|---|---|
| CN | 107931821 A | * | 4/2018 | ........... B23K 20/103 |
| CN | 108393573 A | * | 8/2018 | |
| CN | 114406437 A | * | 4/2022 | .............. B08B 5/04 |
| DE | 102012221482 A1 | * | 5/2014 | ............. B23K 20/10 |
| DE | 102012217437 B4 | * | 4/2018 | ............. B23K 20/10 |
| DE | 112016003596 T5 | | 9/2018 | ............. B23K 20/10 |
| DE | 102019107539 A1 | * | 10/2020 | ........ B29C 66/8227 |
| EP | 0 769 345 B2 | | 1/2005 | |
| JP | 2000-348709 A | | 12/2000 | |
| JP | 2007-335232 A | | 12/2007 | |
| JP | 4433650 B2 | | 3/2010 | |
| JP | 4543662 B2 | | 9/2010 | |
| JP | 2012-43704 A | | 3/2012 | |
| JP | 6397807 B2 | | 9/2018 | |
| JP | 2019-181508 A | | 10/2019 | |
| JP | 6731831 B2 | | 7/2020 | |
| JP | 2020116641 A | * | 8/2020 | |
| KR | 10-0561290 B1 | | 3/2006 | |
| KR | 10-0950977 B1 | | 4/2010 | |
| KR | 10-1152974 B1 | | 6/2012 | |
| KR | 10-2015-0097982 A | | 8/2015 | |
| KR | 10-2016-0039802 A | | 4/2016 | |
| KR | 10-2019-0029623 A | | 3/2019 | |
| KR | 10-2019-0075324 A | | 7/2019 | |
| KR | 10-2022993 B1 | | 9/2019 | |
| KR | 20200032732 A | * | 3/2020 | |
| KR | 10-2021-0103540 A | | 8/2021 | |
| WO | WO-0114124 A1 | * | 3/2001 | .............. B23P 19/06 |
| WO | WO-2006074105 A1 | * | 7/2006 | ....... B29C 66/91431 |
| WO | WO 2020/105434 A1 | | 5/2020 | |

* cited by examiner

[Figure 1]
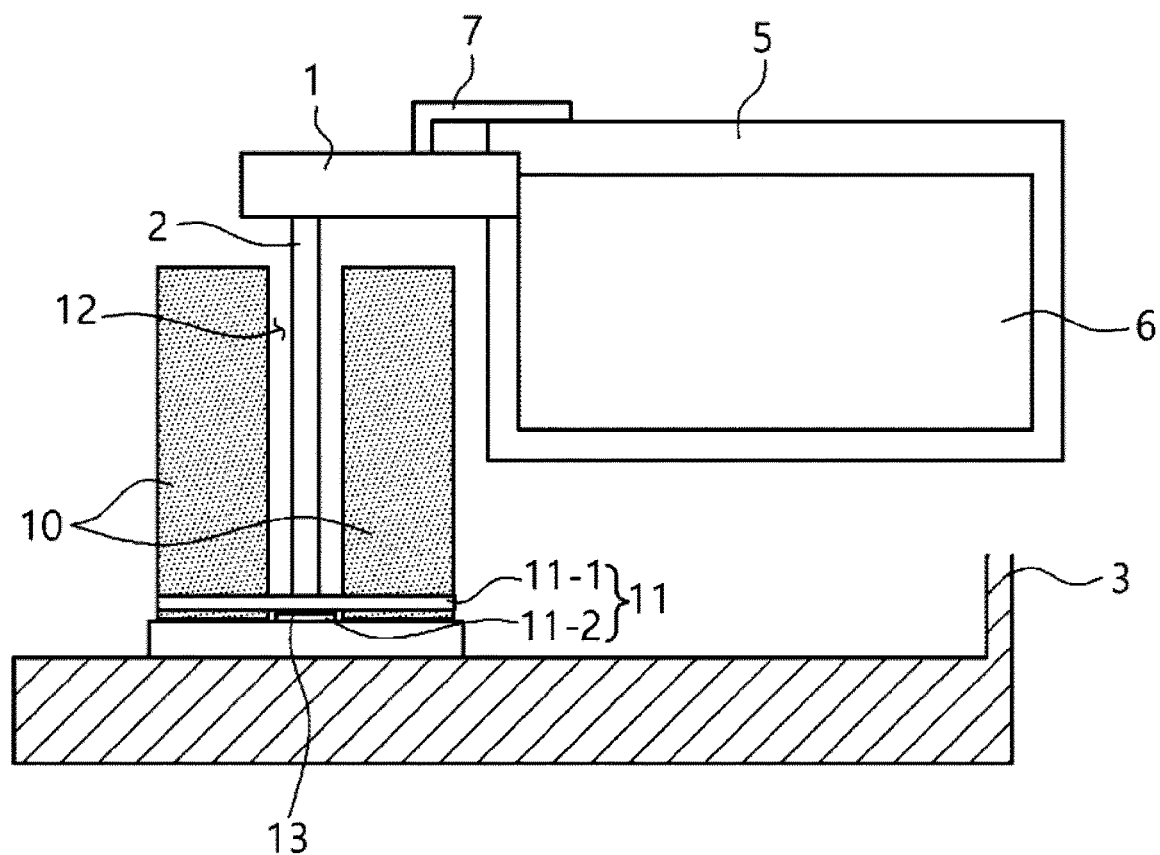

[Figure 2]
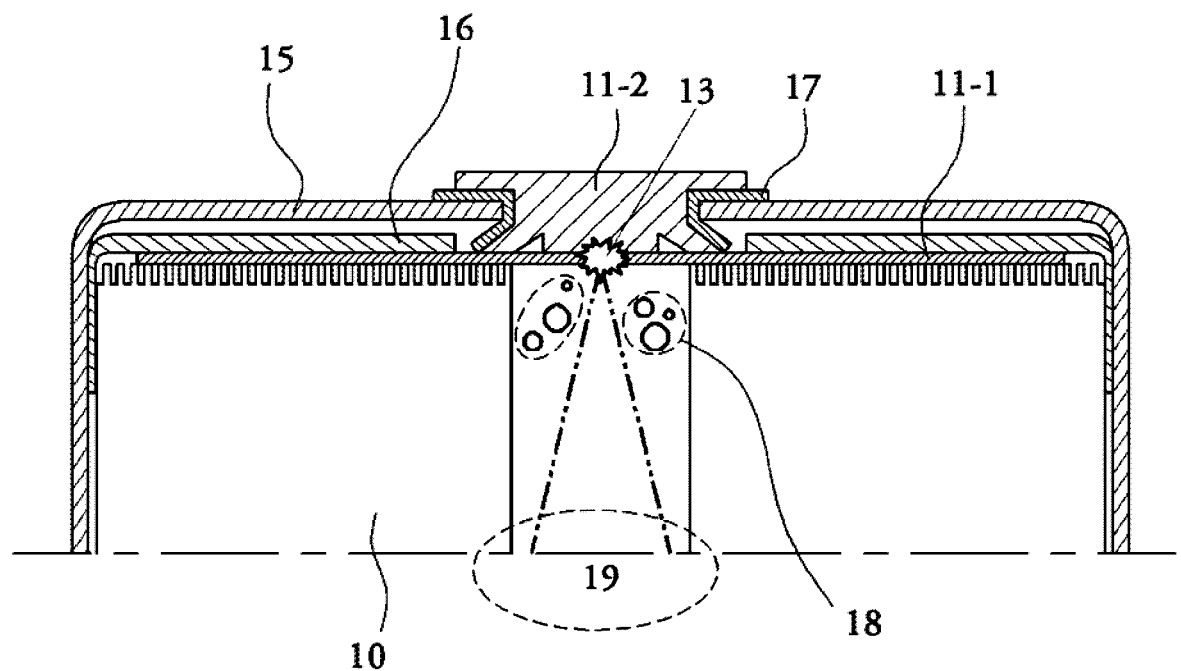
[Figure 3]
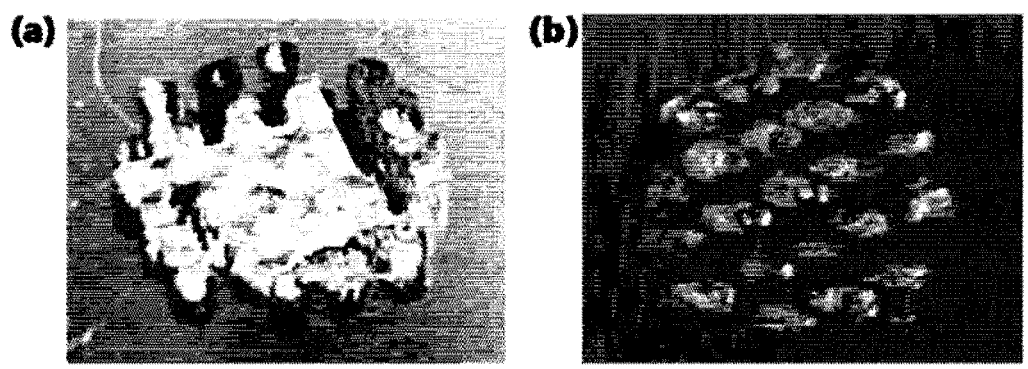

[Figure 4]
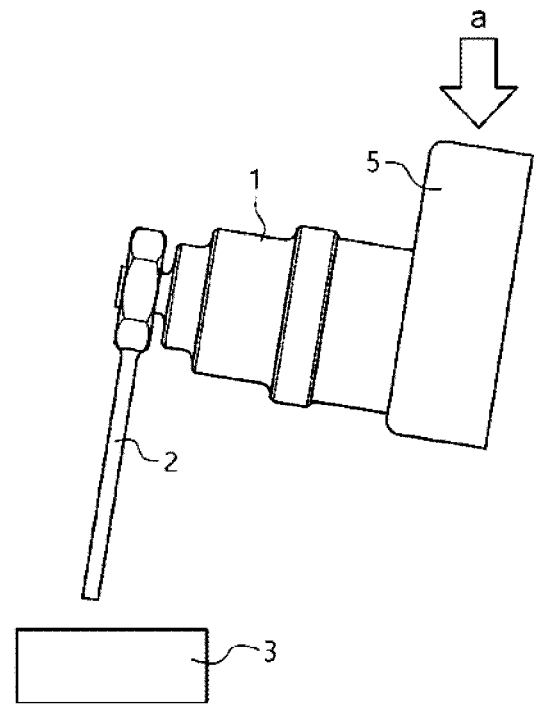
[Figure 5]
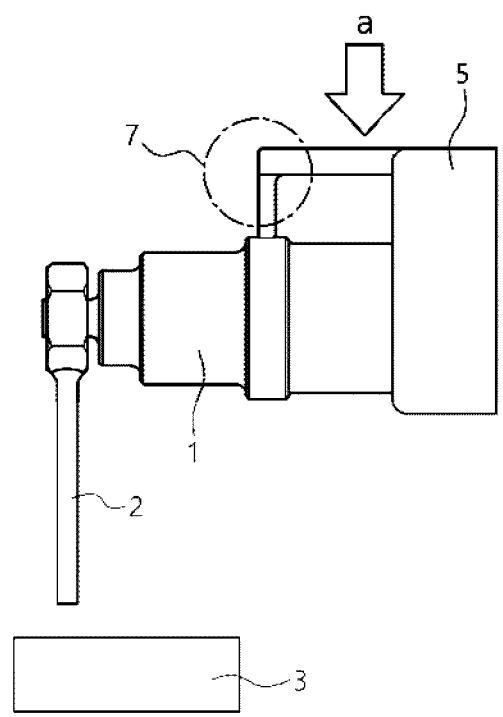

[Figure 6]
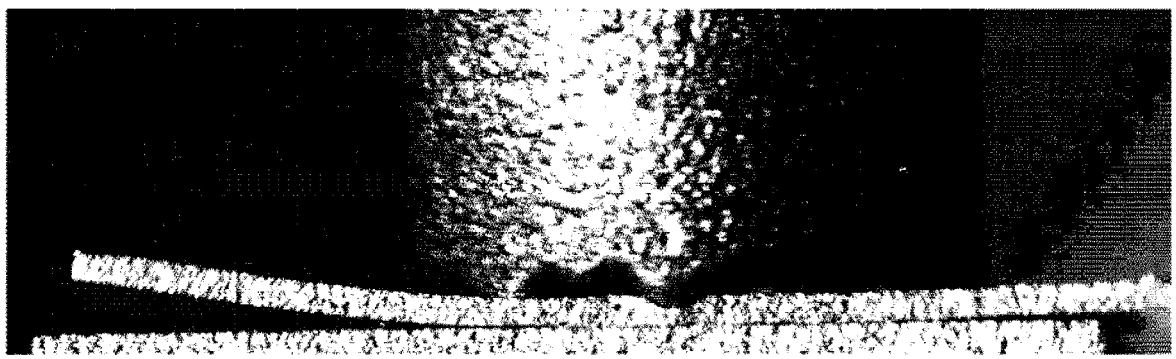
[Figure 7]
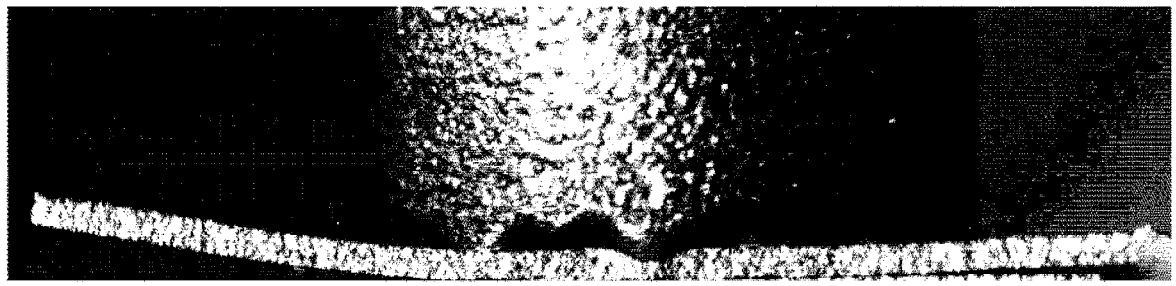

ULTRASONIC WELDING DEVICE

TECHNICAL FIELD

The present invention relates to an ultrasonic welding apparatus.

The present application claims priority to and the benefit of Korean Patent Application No. 10-2021-0160480 filed in the Korean Intellectual Property Office on Nov. 19, 2021, the entire contents of which are incorporated herein by reference.

BACKGROUND ART

Due to characteristics of being easily applicable to various products and electrical characteristics such as high energy density, a secondary battery is not only commonly applied to a portable device, but universally applied to an electric vehicle (EV) or a hybrid electric vehicle (HEV) that is driven by an electrical driving source.

This secondary battery is gaining attention for its primary advantage of remarkably reducing the use of fossil fuels and not generating by-products from the use of energy, making it a new eco-friendly and energy efficient source of energy.

Currently, widely used secondary batteries include lithium ion batteries, lithium polymer batteries, nickel-cadmium batteries, nickel-hydrogen batteries, nickel-zinc batteries, and the like. The operating voltage of a unit secondary battery cell is about 2.5 V to 4.2 V. Therefore, when a higher output voltage is required, a battery pack is configured by connecting a plurality of battery cells in series. In addition, a battery pack may be configured by connecting a plurality of battery cells in parallel according to charge/discharge capacity required for the battery pack. Accordingly, the number of battery cells included in a battery pack and an electrical connection type may be set in various ways according to a required output voltage and/or charge/discharge capacity.

As types of secondary battery cells, cylindrical, prismatic, and pouch-type battery cells are known. In the case of a cylindrical battery cell, a separator that is an insulator is located between a positive electrode and a negative electrode, and wound to form a jelly-roll type electrode assembly, and a battery is formed by inserting the electrode assembly into a battery can together with the electrolyte.

In this case, there is also a structure in which, as a positive electrode terminal of the cylindrical secondary battery, a rivet-type positive electrode terminal penetrating a bottom of the battery can is applied instead of a cap of a sealing body that seals an opening of an existing battery can. However, since a welding process for joining a positive electrode terminal and a positive electrode current collector should be performed through a winding core of the jelly-roll, it is difficult to proceed with welding in a narrow space.

In order to solve the difficulty described above, laser welding has been applied to an object to be welded (e.g., Rivet-type positive electrode terminal and/or positive electrode current collector). However, in the case of laser welding, there is a high risk of internal damage to the jelly-roll type electrode assembly in the cylindrical secondary battery due to a high amount of heat input (i.e., thermal energy) to the object to be welded and spatters resulting from an increase in metal foreign matter.

In order to solve this problem, ultrasonic welding may be applied instead of the laser welding. The ultrasonic welding method can be classified into a linear method (left and right interlocking), a longitudinal method (up and down interlocking), a torsional method, a circular vibration application method, a complex vibration, and the like, according to ultrasonic applying directions. However, when the object to be welded is a metal, such as a secondary battery, a transverse method or a torsional method may be selected.

In order to minimize deformation of the object to be welded, the linear method may be applied. However, there is a problem of foreign matter generation and/or a limitation in weldability improvement.

DETAILED DESCRIPTION OF THE INVENTION

Technical Problem

The present inventors found that, when the linear method (or transverse method) was applied, foreign matter was collected at one or more points on the object to be welded where a traveling direction of linear vibration was switched. Accordingly, it was confirmed that the above problems and limitations could be overcome by installing a suction device at a specific location in the ultrasonic welding apparatus in order to remove the collected foreign matter.

Based on the technical idea described above, the present invention is to improve a shape of an ultrasonic welding member, and to provide an ultrasonic welding apparatus including such a welding member.

Technical Solution

An exemplary embodiment of the present application provides an ultrasonic welding apparatus including: a housing; a horn coupled to the housing and configured to transmit an ultrasonic wave in a first direction; a tip coupled to the horn and configured to apply the ultrasonic wave transmitted from the horn to an object to be welded, and to apply the ultrasonic wave at an angle in a range of 80° to 100° with respect to the first direction; an anvil configured to support the object to be welded; and a suction device connected to the anvil and configured to remove foreign matter generated from ultrasonic welding performed on the object to be welded, in which the tip is configured to be driven by linear vibration with respect to the object to be welded.

Advantageous Effects

As compared with welding apparatuses of the related art, the ultrasonic welding apparatus according to an exemplary embodiment of the present application can reduce an amount of heat input (thermal energy) to the object to be welded during welding, thereby reducing a risk of internal damage to an electrode assembly.

In addition, the ultrasonic welding apparatus according to an exemplary embodiment of the present application exhibits excellent weldability when applied to a positive electrode current collector and/or a positive electrode terminal of a secondary battery, as compared with welding apparatuses of the related art.

Further, the ultrasonic welding apparatus according to an exemplary embodiment of the present application efficiently collects the foreign matter generated resulting from ultrasonic welding, as compared with welding apparatuses of the related art, and therefore, can easily remove the foreign matter.

BRIEF DESCRIPTION OF DRAWINGS

FIGS. 1, 4 and 5 are schematic views of an ultrasonic welding apparatus according to an exemplary embodiment of the present invention.

FIG. 2 is a schematic view of a laser welding apparatus of the related art.

FIG. 3 is a view showing a weldability evaluation.

FIGS. 6 and 7 are photographs taken during real-time welding of an ultrasonic welding apparatus according to an exemplary embodiment of the present invention.

EXPLANATION OF REFERENCE NUMERALS AND SYMBOLS

1: horn (part)
2: tip (part)
3: anvil (part)
5: housing
6: booster
7: horn deflection-prevention fixing pin
10: electrode assembly (cross section)
11-1: electrode current collector (positive electrode current collector)
11-2: electrode terminal (positive electrode terminal)
12: cavity
13: weld part
15: battery can
16: insulator
17: gasket
18: spatter
19: laser beam
a: center of gravity

BEST MODE

The terms or words used throughout the specification and the claims should not be construed as being limited to their ordinary or dictionary meanings, but construed as having meanings and concepts consistent with the technical idea of the present invention, based on the principle that an inventor may properly define the concepts of the words or terms to best explain the invention.

Throughout the present specification, unless explicitly described to the contrary, when a part "includes", "comprises" or "has" a certain constituent element, this does not mean that another constituent element is excluded, but means that another constituent element may be further included.

In addition, terms such as "part" and "device" described in the specification should be understood as a unit that performs at least one function or operation.

In addition, unless otherwise specified, terms such as "equal to or more than" or "equal to or less than" described in the specification mean a value that is approximately above or below the number, respectively. For example, the term '1 or greater' refers to a value 2, 3, 4, 5, . . . , 10, . . . , 20, and the like, including '1', and can include not only integers but also decimals between integers.

Also, terms such as "about" or "approximately" described in the specification indicate approximate values, regardless of whether they are used in relation to numbers. They can vary by 1%, 2%, 3%, . . . , 20% with respect to that number.

Hereinafter, exemplary embodiments of the present invention will be described with reference to the drawings. However, it should be noted that they are intended to aid understanding of the present invention and the scope of the present invention is not limited thereto.

An exemplary embodiment of the present invention provides an ultrasonic welding apparatus including: a housing; a horn part coupled to the housing and configured to transmit an ultrasonic wave in one direction; a tip part coupled to the horn part and configured to apply the ultrasonic wave transmitted from the horn part to an object to be welded, and to apply the ultrasonic wave at an angle of 80° or greater and 100° or less with respect to a direction in which the horn part transmits the ultrasonic wave; an anvil part configured to support the object to be welded; and a suction connected to the anvil part and configured to suck a foreign matter generated resulting from ultrasonic welding performed on the object to be welded, in which the tip part is configured to be driven by linear vibration with respect to the object to be welded.

The ultrasonic welding apparatus according to an exemplary embodiment of the present invention modifies a structure of the related art in which a horn part and a tip part are connected in a T-shape, thereby eliminating a problem of the T-shaped structure lowering a degree of freedom upon application of ultrasonic waves, and securing a degree of freedom necessary for welding to an object to be welded to facilitate welding.

In addition, in the ultrasonic welding apparatus according to an exemplary embodiment of the present invention, the tip part is driven by linear vibration with respect to the object to be welded, so that foreign matter (e.g., metal foreign matter) can be collected at one or more points where the traveling direction of the linear vibration is switched (e.g., when a traveling direction of linear vibration is to the right, a point (deflection point) where the traveling direction of linear vibration is switched to the left, and/or vice versa). In this case, the foreign matter collected on the object to be welded can be removed by suction. That is, the foreign matter can be easily removed.

In addition, the ultrasonic welding apparatus according to an exemplary embodiment of the present invention can secure significantly improved weldability, as compared with weldability when applying a laser welding apparatus of the related art.

In an exemplary embodiment of the present invention, the suction may be arranged at at least one of one or more points on the object to be welded where the traveling direction of the linear vibration is switched.

In the present specification, the housing refers to a main body to which the horn part and the anvil part are coupled to the extent of having a degree of freedom necessary for a welding operation.

In the present specification, the horn part may be referred to as a horn or an ultrasonic welding horn part, and the shape and other specifications of the horn part and the material constituting the horn part are not particularly limited as long as the horn part transmits ultrasonic waves (vibration).

In the present specification, the tip part is coupled to the horn part, and the horn and the tip are formed into an 'L' shape or an approximate 'L' shape to obtain the degree of freedom necessary for welding, and thus ultrasonic waves can be easily applied to the object to be welded. In addition, the tip part may be referred to as a tip or an ultrasonic welding tip part, and the shape and other specifications of the tip part and the material constituting the horn part are not particularly limited as long as the tip part can easily receive ultrasonic waves (vibration) transmitted from the horn part and apply the ultrasonic waves to the object to be welded.

In the present specification, an angle at which the tip part applies the ultrasonic waves to the object to the welded may be approximately 80° or greater and approximately 100° or less, preferably approximately 85° or greater and approximately 95° or less, more preferably vertical (approximately 90°) with respect to a direction in which the horn part transmits the ultrasonic waves.

In the present specification, the anvil part may be selectively connected to the housing and serves to support the object to be welded. In this case, the anvil part supports the object to be welded at a position opposite to a position where the tip part and the object to be welded are in contact with each other. For example, when the tip part contacts an upper part of the object to be welded, the anvil part contacts a lower part of the object to be welded.

In the present specification, the suction may be installed at at least one of one or more points where the traveling direction of the linear vibration is switched in order to suck the foreign matter collected on the object to be welded. In some cases, the suction may be installed inclined at an angle greater than about 0°, greater than about 10°, greater than about 20°, or greater than about 30° based on the object to be welded or the anvil part, assuming that the object to be welded is supported on the anvil part. In some cases, the suction may be installed close to one or more points where the traveling direction of the linear vibration is switched, or spaced apart within a range that is allowed to the extent that the suction is drivable.

In an exemplary embodiment of the present invention, the horn part may be driven at an amplitude of 30 μm or less. Preferably, the horn part may be driven at an amplitude of about 29 μm or less, about 28 μm or less, or 27 μm or less. When the amplitude falls within the range of the above-exemplified amplitude, the ultrasonic welding efficiency is excellent.

In an exemplary embodiment of the present invention, a horn deflection-prevention fixing pin may be further included on the horn part.

In the present specification, the horn deflection-prevention fixing pin prevents a factor of non-uniform welding caused by tip deflection (measured by indentation shape symmetry ratio). The horn deflection-prevention fixing pin means a bridge that additionally connects the housing and the horn. The horn can be aligned parallel to a second welding surface (described later) of the anvil and a first welding surface (described later) of the tip part can be aligned parallel to the second welding surface of the anvil by the horn deflection-prevention fixing pin.

According to an exemplary embodiment of the present invention, an ultrasonic booster may be further included inside the housing.

In the present specification, the ultrasonic booster is a member for generating, adjusting, and controlling ultrasonic waves necessary for ultrasonic welding, and an ultrasonic booster known in the art may be used.

According to an exemplary embodiment of the present invention, the horn part may include a means for coupling with the ultrasonic booster at one end portion, and the tip part may be coupled at a position within 50% of an entire length of the horn part from the other end portion opposite to one end portion of the horn part at which the means for coupling with the ultrasonic booster is provided. Preferably, the tip part may be coupled at a position within about 40%, preferably within about 30%, more preferably within about 20% or about 10%, and most preferably within about 5% or beyond 0% of the entire length of the horn part from the other end portion opposite to one end portion of the horn part at which the means for coupling with the ultrasonic booster is provided. Here, "within" may be used interchangeably with the terms "equal to or less than" or "less than".

The ultrasonic welding apparatus according to an exemplary embodiment of the present invention implements an 'L-shaped' or 'approximately L-shaped' ultrasonic welding apparatus, as compared with the 'T-shaped' ultrasonic welding apparatus of the related art, and therefore, can improve the degree of freedom when applying the ultrasonic waves to the object to be welded.

In an exemplary embodiment of the present invention, the tip part may have a first welding surface from which the ultrasonic waves transmitted from the horn part are applied to one surface of the object to be welded, and the anvil part may have a second welding surface arranged on an opposite surface to a surface of the object to be welded with which the first welding surface is in contact.

In the present specification, the first and second welding surfaces are terms for separately defining surfaces of members (i.e., the tip part and the anvil part) that come into contact with the object to be welded.

In an exemplary embodiment of the present invention, a vertical cross-section of the tip part in a direction in which the ultrasonic waves are applied may be a curve.

In the present specification, assuming that a direction in which the tip part applies ultrasonic waves to the object to be welded is one straight line, the vertical cross-section refers to a plane obtained by cutting the tip part with another straight line intersecting the one straight line at a right angle, and the curve refers to a bent line that is not a straight line, such as a circle, an ellipse, or a parabola, when three or more arbitrary points of the vertical cross-section are connected.

In an exemplary embodiment of the present invention, the vertical cross-section of the tip part in the direction in which the ultrasonic waves are applied may be a circular shape.

In the ultrasonic welding apparatus according to an exemplary embodiment of the present specification, the structure of the related art where the vertical cross-section of the tip part is a rectangular shape is modified into the curve or the circular shape. As a result, a possibility that the tip having a rectangular vertical cross-section will cause a buckling phenomenon in an object to be welded can be eliminated, and the buckling phenomenon occurring in the object to be welded can be minimized.

In the present specification, the circular shape is the same as defined in geometry, and refers to a set of points having the same distance from one point of the vertical cross-section.

In an exemplary embodiment of the present invention, a knurl plate provided on the first welding surface of the tip part may be further included.

In the present specification, the knurl plate refers to a plate including one or more knurls. In the present specification, each knurl and/or knurl plate is known in the art and is not particularly limited.

In an exemplary embodiment of the present invention, each of the knurls of the knurl plate may be rectangular.

As compared with an ultrasonic welding apparatus including a knurl plate having diamond pattern, the ultrasonic welding apparatus according to an exemplary embodiment of the present invention has a wider contact area in which each knurl is in horizontal contact in a vibration direction, so occurrence of the foreign matter (e.g., crack) is reduced.

In an exemplary embodiment of the present invention, the object to be welded may be an electrode terminal and an electrode current collector of a secondary battery.

In an exemplary embodiment of the present invention, the electrode terminal and the electrode current collector may have the same polarity.

In an exemplary embodiment of the present invention, the object to be welded may be a positive electrode terminal and a positive electrode current collector of a secondary battery, and the positive electrode terminal and the positive electrode current collector may include aluminum.

In an exemplary embodiment of the present invention, the electrode terminal may be riveted through a through-hole formed in a bottom of the battery can.

In an exemplary embodiment of the present invention, the secondary battery may include an electrode assembly wound in a state in which a first electrode, a separator, and a second electrode are sequentially stacked, the wound electrode assembly may include a cavity in a core, and the tip part may pass through the cavity and perform ultrasonic welding on the electrode terminal and the electrode current collector.

In an exemplary embodiment of the present invention, a diameter of a core part of the wound electrode assembly may be 0.6 mm or less.

The ultrasonic welding apparatus according to an exemplary embodiment of the present invention can solve a problem that it is difficult for a laser welding apparatus of the related art to secure good weldability in a state where the diameter of the core part of the wound electrode assembly is 0.6 mm or less.

The ultrasonic welding apparatus according to an exemplary embodiment of the present invention can pass through the cavity of the core part and sufficiently secure improved weldability even when the diameter of the core part of the electrode assembly in a wound state is as small as 0.6 mm or less.

In the present specification, a lower limit of the diameter of the core part of the wound electrode assembly is not particularly determined, but may vary depending on the specification of the tip part, which is an ultrasonic applying member known in the art.

In the present specification, the lower limit of the diameter of the core part of the wound electrode assembly is not particularly limited as long as it is within an allowable range of the diameter of the core part of the electrode assembly in a wound state (i.e., jelly-roll type electrode assembly) known in the art.

In an exemplary embodiment of the present invention, the positive electrode current collector includes aluminum metal, and its thickness (t) may be 0.1 mm to 0.5 mm, preferably 0.2 mm to 0.4 mm, and more preferably about 0.3 mm.

In an exemplary embodiment of the present invention, the positive electrode terminal is a riveted positive electrode terminal, and includes aluminum metal, and its thickness is 2.9 mm to 3.5 mm, preferably 3.0 mm to 3.4 mm, and more preferably 3.1 mm to 3.3 mm.

In the present specification, the secondary battery may be a cylindrical secondary battery having a form factor ratio (defined as a value obtained by dividing a diameter of a cylindrical battery by a height, i.e., a ratio of a diameter ($\Phi$) to a height (H)) of greater than 0.4. Here, the form factors refer to values representing a diameter and a height of a cylindrical secondary battery.

In the related art, batteries with a form factor ratio of approximately 0.4 or less have been used. That is, in the related art, for example, an 18650 cell, a 21700 cell, and the like have been used. For an 18650 cell, a diameter is approximately 18 mm, a height is approximately 65 mm, and a form factor ratio is approximately 0.277. For a 21700 cell, a diameter is approximately 21 mm, a height is approximately 70 mm, and a form factor ratio is approximately 0.300.

A cylindrical secondary battery according to an exemplary embodiment of the present specification may be a 46110 cell, a 48750 cell, a 48110 cell, a 48800 cell, or a 46800 cell. In the numerical value representing the form factor, the first two numbers indicate a diameter of a cell, the next two numbers indicate a height of the cell, and the last number 0 indicates that a cross section of the cell is circular.

The secondary battery according to an exemplary embodiment of the present specification is a columnar secondary battery having a diameter of 46 mm, a height of 110 mm, and a form factor ratio of 0.418.

The secondary battery according to an exemplary embodiment of the present specification is a columnar secondary battery having a diameter of 48 mm, a height of 75 mm, and a form factor ratio of 0.640.

The secondary battery according to an exemplary embodiment of the present specification is a columnar secondary battery having a diameter of 48 mm, a height of 110 mm, and a form factor ratio of 0.418.

The secondary battery according to an exemplary embodiment of the present specification is a columnar secondary battery having a diameter of 48 mm, a height of 80 mm, and a form factor ratio of 0.600.

The secondary battery according to an exemplary embodiment of the present specification is a columnar secondary battery having a diameter of 46 mm, a height of 80 mm, and a form factor ratio of 0.575.

In the present specification, the electrode assembly includes an electrode assembly wound in a state in which a first electrode, a separator, and a second electrode are sequentially stacked, and each of the first electrode and the second electrode includes am uncoated portion to which an electrode active material is not applied. The uncoated portion of the first electrode and the uncoated portion of the second electrode are arranged in opposite directions, the uncoated portion of the first electrode is electrically connected to the current collector of the first electrode, and the uncoated portion of the second electrode is electrically connected to the current collector of the second electrode.

In the present specification, an electrode tab may be formed by forming a metal foil by slitting an electrode having a stripe pattern in order to reduce cell resistance in the uncoated portion, or an electrode tab may be formed by connecting an additional tab to the uncoated portion.

In the present specification, the battery can may be electrically connected to the first electrode.

In the present specification, the battery can may further include an insulator provided between the current collector of the second electrode and an inner surface of the battery can, which can prevent contact between different polarities, i.e., the current collector of the second electrode and the battery can electrically connected to the first electrode.

In the present specification, the battery can may further include a gasket interposed between the electrode terminals.

According to FIG. 1, it is schematically shown that a tip part 2 of the ultrasonic welding member passes through a cavity 12 (or referred to as a central penetration portion) of an electrode assembly 10 (jelly-roll type), and ultrasonic welding (weld part 13) is performed on a positive electrode current collector 11-1 (material: Al, thickness (t): about 0.3 mm) and a riveted positive electrode terminal (11-2) (material: Al, thickness (t): about 3.1 mm) as an object to be welded 11. However, in FIG. 1, a battery can and other components (e.g.: a member (not shown) for connecting a horn and a tip, a cap assembly, etc.) are omitted.

FIG. 2 shows a laser welding apparatus of the related art. Specifically, when a rivet-type electrode terminal (riveted positive electrode terminal 11-2) and an electrode current collector (positive electrode current collector 11-1) are welded, spatters 18 are generated around a weld part 13. The generation of spatters causes welding defects and is a factor that rapidly increases a probability of generation of foreign matter. In addition, a laser beam 19 used for welding may reach an electrode assembly 10 other than the object to be welded (positive electrode current collector 11-1 and positive electrode terminal 11-2), which may increase the risk of interference.

FIG. 3 shows a weldability evaluation. According to FIG. 3(a), when the ultrasonic welding apparatus according to an exemplary embodiment of the present invention is used for the positive electrode terminal and the positive electrode current collector, excellent welding is achieved. On the other hand, as shown in FIG. 3(b), when a laser welding apparatus of the related art is used for the positive electrode terminal and the positive electrode current collector, a non-welded portion occurs, and therefore, it is difficult to secure good weldability.

FIG. 4 shows a schematic view in which the center of gravity is put on the housing side when the horn deflection-prevention fixing pin 7 is not provided. Accordingly, the tip part 2 is deflected, welding is performed asymmetrically or non-uniformly, and some weak welding may occur, thereby making it vulnerable to external impact or increasing the probability of the generation of foreign matter.

FIG. 5 shows a schematic view in which the center of gravity is put on the horn part 1 side when the horn deflection-prevention fixing pin 7 is provided. Accordingly, the tip part is fixed, and the first welding surface (not shown) of the tip part and the second welding surface (not shown) of the anvil part 3 can be aligned parallel, so that a welding quality is improved and the probability of the generation of foreign matter can be significantly lowered.

In the below, implementations of the present invention will be described. However, it should be noted that they are intended to aid understanding of the present invention and the scope of the present invention is not limited thereto.

FIGS. 6 and 7 are photographs taken during real-time welding of an ultrasonic welding apparatus according to an exemplary embodiment of the present invention, in which foreign matter is generated on an object to be welded at at least some of one or more points where the traveling direction of linear vibration is switched.

Although the present invention has been described with reference to the limited embodiments and drawings, the present invention is not limited thereto, and a variety of modifications and variations can be made within the technical spirit of the present invention and the equivalent range of the claims described below by one skilled in the art to which the present invention belongs.

The invention claimed is:

1. An ultrasonic welding apparatus comprising:
a housing;
a horn coupled to the housing and configured to transmit an ultrasonic wave in a first direction;
a tip coupled to the horn and configured to apply the ultrasonic wave transmitted from the horn to an object to be welded, and to apply the ultrasonic wave at an angle in a range of 80° to 100° with respect to the first direction;
an anvil configured to support the object to be welded; and
a horn deflection-prevention fixing pin extending from the horn to the housing,
wherein the tip is configured to be driven by linear vibration with respect to the object to be welded.

2. The ultrasonic welding apparatus of claim 1, wherein the horn is driven at an amplitude of 30 μm or less.

3. The ultrasonic welding apparatus of claim 1, further comprising an ultrasonic booster inside the housing.

4. The ultrasonic welding apparatus of claim 3, wherein the horn is coupled to the ultrasonic booster at a first end portion, and
wherein the tip is coupled at a position within 50% of an entire length of the horn from a second end portion opposite to the first end portion.

5. The ultrasonic welding apparatus of claim 1, wherein the tip has a first welding surface from which the ultrasonic wave transmitted from the horn is applied to one surface of the object to be welded, and
wherein the anvil has a second welding surface arranged on an opposite surface to a surface of the object to be welded with which the first welding surface is in contact.

6. The ultrasonic welding apparatus of claim 1, further comprising a knurl plate provided on a first welding surface of the tip.

7. The ultrasonic welding apparatus of claim 6, wherein each knurl of the knurl plate has a rectangular shape.

8. The ultrasonic welding apparatus of claim 1, wherein the object to be welded is at least one of an electrode terminal and an electrode current collector of a secondary battery.

9. The ultrasonic welding apparatus of claim 8, wherein the electrode terminal and the electrode current collector have a same polarity.

10. The ultrasonic welding apparatus of claim 8, wherein the electrode terminal is riveted through a through-hole formed in a bottom of a battery can.

11. The ultrasonic welding apparatus of claim 8, wherein the secondary battery comprises an electrode assembly wound in a state in which a first electrode, a separator, and a second electrode are sequentially stacked,
wherein the wound electrode assembly comprises a cavity in a core part, and
wherein the tip is configured to pass through the cavity and to perform ultrasonic welding on the electrode terminal and the electrode current collector.

12. The ultrasonic welding apparatus of claim 11, wherein a diameter of the core part of the wound electrode assembly is 0.6 mm or less.

13. The ultrasonic welding apparatus of claim 1, wherein the horn deflection-prevention fixing pin is L-shaped.

* * * * *